Figure 1:
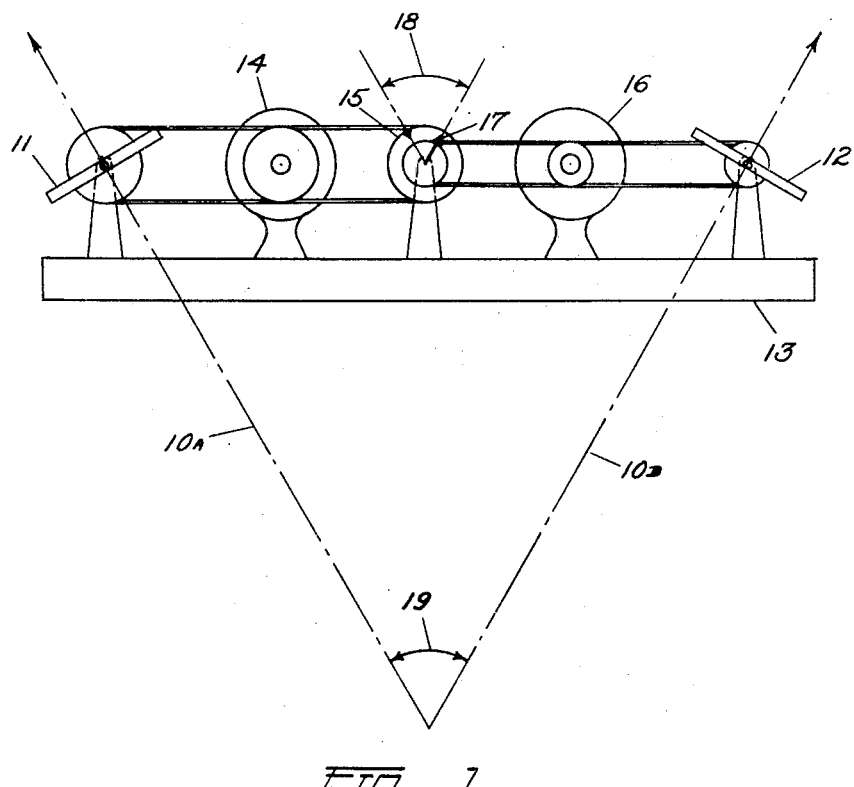

Dec. 6, 1949 J. H. STEIN 2,490,102
MAGNETIC FIELD ANGULAR GRADIENTOMETER
Filed May 10, 1946 2 Sheets-Sheet 1

INVENTOR.
JAMES H. STEIN
BY
ATTORNEY

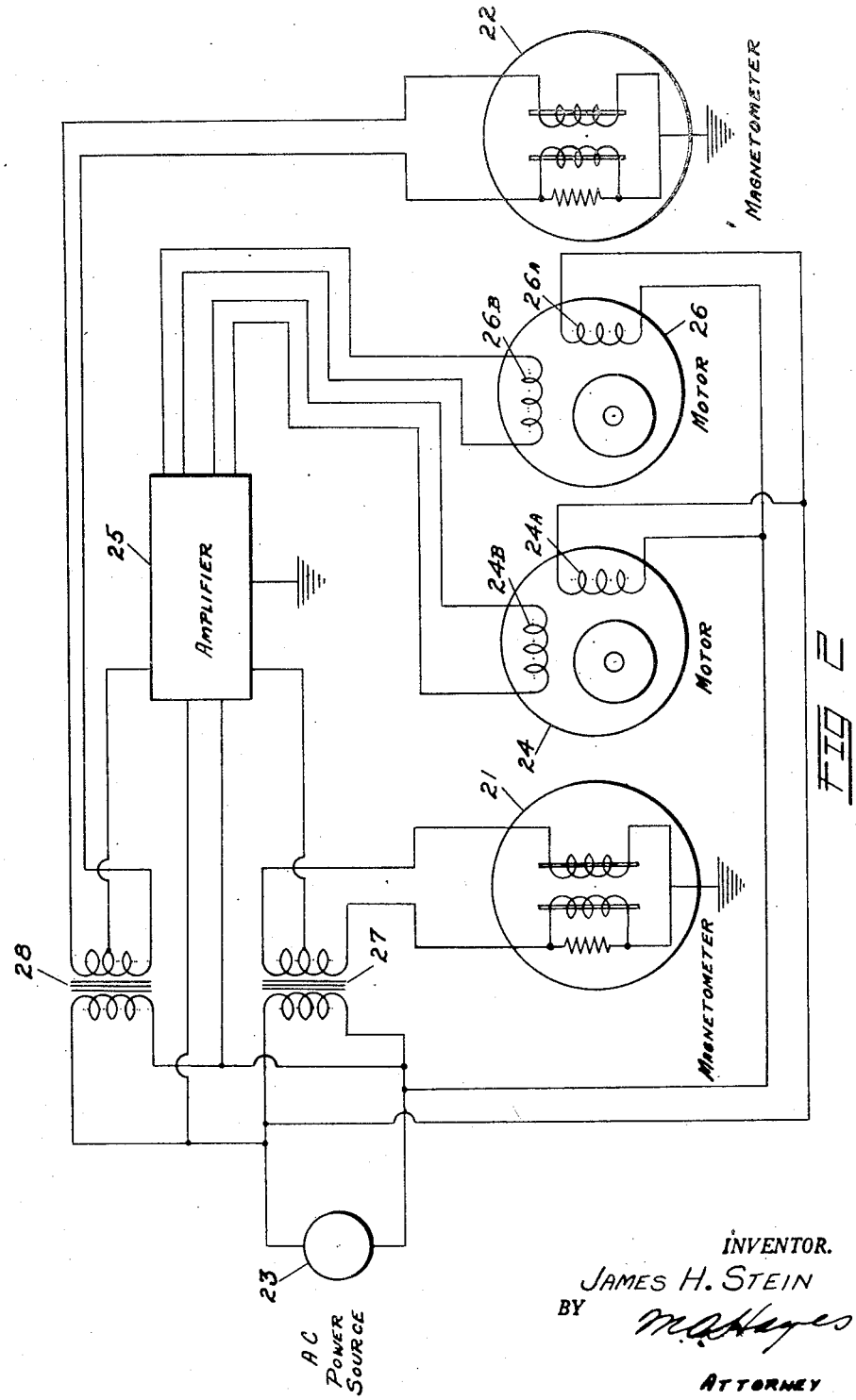

Patented Dec. 6, 1949

2,490,102

UNITED STATES PATENT OFFICE 2,490,102

MAGNETIC FIELD ANGULAR GRADIENTOMETER

James H. Stein, Toms River, N. J.

Application May 10, 1946, Serial No. 668,992

6 Claims. (Cl. 175—183)

(Granted under the act of March 3, 1883, as amended April 30, 1928; 370 O. G. 757)

This invention relates in general to an electrical system and more specifically to a magnetic gradientometer for surveying the magnetic field of a carrier or the like.

The usual magnetic field gradientometer measures the difference in magnitude of two parallel field components at separate locations. Herein disclosed is a device to measure the angular difference between the directions of two selected field components without regard to their amplitude. The word "selected," as used herein, is intended to mean that the components lie in the plane of rotation of the magnetometers at the location at which the device is operated.

Further advantages of this novel device are that the measurements may be made in one operation and the results may be read directly from a calibrated scale.

One object of this invention is to provide a system whereby the angular difference between the direction of the magnetic field at one point and the direction of that field at another point may be measured by a single reading of an instrument.

Further objects and advantages of this invention, as well as its construction, arrangement and operation, will be apparent from the following description and claims in connection with the accompanying drawings, in which, Fig. 1 is a diagrammatic representation of the physical layout of a preferred form of the novel gradientometer including the mechanical connections and vectors representing magnetic field components, and Fig. 2 is a partial schematic diagram of the electrical connections of the system.

Two self-aligning magnetometers 11 and 12, hereinafter referred to as magnetometers, are mounted, as shown in Fig. 1, at opposite ends of a rigid supporting member 13, the length of said member not being critical, but depending upon the application of the device. The magnetometers are so constructed as to orient themselves in the direction of the minimum magnetic field with the aid of a suitable control system.

The control system is comprised of an amplifier 25, as in Fig. 2, and two motors 14 and 16. Motor 14 aligns magnetometer 11 and also drives a circular scale 15 which rotates about its axis. Motor 16 aligns magnetometer 12 and drives a pointer 17, said pointer being mounted concentric to the axis of the scale 15. The scale and pointer show no relative motion so long as the two magnetometer units remain parallel to each other as would be the case in which the direction of the magnetic field components is the same at each end of the supporting member. When the field components at the respective ends of the supporting member are not in the same direction, the magnetometer units do not remain parallel and therefore produce a relative displacement between the scale and pointer. The amount of displacement may be read directly from scale 15 calibrated in terms of degrees, and this value is the angular difference between the directions of the magnetic field components at the points under survey. Vectors 10A and 10B in Fig. 1 represent the directions of the components of the magnetic field and angle 19 is the actual angular gradient. Angle 18 as read from the scale is the indicated angular gradient which is equal to angle 19.

Fig. 2 illustrates the path of signals throughout the system. The power source 23 provides alternating current of any practical voltage and frequency. For test purposes of this device and other applications involving magnetometers of the type employed herein, 115 volts A. C. at 400 cycles per second has proved to be quite satisfactory. The A. C. voltage is fed directly to the driver transformers 27 and 28, amplifier 25 power supply and one of the fields of each motor, 24A of motor 24 and 26A of motor 26. The secondary windings of the driver transformers 27 and 28 are connected to the windings of magnetometer units 21 and 22 respectively. A center tap on the secondary winding of each driver transformer is connected to the amplifier input channels. The amplifier outputs are connected respectively to the second motor field, 24B of motor 24 and 26B of motor 26.

Briefly, the theory of operation is as follows: The orientator windings of the magnetometer serve to keep the magnetometer at right angles to the component of the ambient magnetic field which lies in the plane of rotation of the magnetometer. When the element is properly oriented, the output of the orientator windings is a series of balanced peaks, alternately positive and negative in character. When the magnetometer becomes misoriented so that the orientator windings are no longer at right angles to the field the peaks become unbalanced, the direction of misalignment determining whether the positive or negative peaks decrease. The amplifier output, in turn, increases and causes the motor to return the magnetometer to the oriented position. The direction of rotation of the motor depends on the polarity of the unbalanced peaks.

The path of control data within the device is as follows: electrical impulses are set up within the magnetometer windings and applied to the amplifier input channels. From the amplifier, electrical impulses are transmitted to one field of one motor, depending upon which magnetometer is acting. The impulses are transformed into mechanical energy at the motor and serve to bring the magnetometer into orientation through a mechanical connection, in this case a wire belt, and also drives the pointer or scale through another belt, depending upon which motor is operating. These connections may be seen by study of Figs. 1 and 2.

A full description of the construction and operation of the magnetometers is contained in copending application Serial Number 516,612 "Unbalanced magnetometers" of Otto H. Schmitt. A suitable amplifier for the system is completely described in copending application Serial Number 532,144, "Orientation system," of Otto H. Schmitt. This amplifier is not the only type that can be used, but it has proved satisfactory in tests. A two-channel amplifier is required, however, to accommodate the two magnetometer inputs and two motor control circuits.

The motors employed are two-phase induction motors known as servomotors. The Kollsman type 766-04 was used in the model but any similar type is suitable.

The type of indicator used herein is not limited to a rotating scale and pointer system but may be a sliding linear type of scale, an electrical indicator or other electro-mechanical types.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A device for measuring, in one operation, the angular gradient between two selected magnetic field components, said device comprising a rigid support having two magnetometers mounted at opposite ends thereon; an indicator having a rotatable circular scale mounted on its axis and a pointer mounted concentric to the axis of said scale; a control means associated with one of said magnetometers for aligning said magnetometer and said scale of said indicator in response to data therefrom, and means associated with the other of said magnetometers for aligning said other magnetometer and said pointer of said indicator in response to data therefrom.

2. Magnetic indicator apparatus, comprising pair of spaced moving-coil magnetometers having individual motive means for moving the respective coils of said magnetometers to positions corresponding to the direction of the magnetic field at the locations of the magnetometers, a first movable member connected to one of said motive means and adapted to be positioned thereby in accordance with the orientation of the one of said coils moved by said one motive means, and a second movable member connected to the other of said motive means and adapted to be positioned thereby in accordance with the orientation of the other of said coils, and means concentrically mounting said first and second movable members for simultaneous observation of the displacement thereof, whereby relative displacement of said members is readily ascertained.

3. The apparatus defined in claim 2 wherein said first movable member is a circular scale, and said second movable member is a pointer.

4. An apparatus of the character described, comprising magnetometer means located at a pair of spaced points in a magnetic field and responsive to variations in the direction of the field at said points to orientate said magnetometer means in accordance with said variations, said magnetometer means including means for generating electric signals having characteristics variable in accordance with the variations in orientation of the respective magnetometer means, coaxially mounted indicating means for each of said magnetometer means, and motive means coupled to said indicating means and actuatable in response to said electric signals to orientate said indicating means in synchronism with the orientation of said magnetometer means.

5. An apparatus of the character described, comprising magnetometer means located at a pair of spaced points in a magnetic field and responsive to variations in the direction of the field at said points to orientate said magnetometer means in accordance with said variations, said magnetometer means including means for generating electric signals having characteristics variable in accordance with the variations in orientation of the respective magnetometer means, indicating means for each of said magnetometer means and including relatively rotatable members mounted on a common axis, and motive means coupled to said indicating means and actuatable in response to said electric signals to orientate said indicating means in synchronism with the orientation of said magnetometer means.

6. A device for measuring the angular gradient between two selected magnetic field components, said device comprising a support having two magnetometers mounted at opposite ends thereon; an indicator having a rotatable circular scale mounted on its axis and a pointer mounted concentric to the axis of said scale; means associated with one of said magnetometers for aligning said magnetometer and said scale of said indicator in response to data therefrom, and means associated with the other of said magnetometers for aligning said other magnetometer and said pointer of said indicator in response to data therefrom.

JOHN H. STEIN.

REFERENCES CITED

The following references are of record in the file of this patent:

UNITED STATES PATENTS

| Number | Name | Date |
|---|---|---|
| 1,526,391 | Stewart | Feb. 17, 1925 |
| 1,721,375 | De Koning | July 16, 1929 |
| 1,971,189 | Leibing | Aug. 21, 1934 |
| 2,027,393 | McCreary | Jan. 14, 1936 |
| 2,047,609 | Antranikian | July 14, 1936 |
| 2,308,566 | Noxon | Jan. 19, 1943 |
| 2,407,202 | Vacquier | Sept. 3, 1946 |

FOREIGN PATENTS

| Number | Country | Date |
|---|---|---|
| 25,645 | Great Britain of 1909 | Oct. 6, 1910 |